United States Patent [19]

Simmons

[11] 4,023,327
[45] May 17, 1977

[54] CONTROL SYSTEM FOR PACKAGE MAKING MACHINE

[75] Inventor: Charles J. Simmons, East Longmeadow, Mass.

[73] Assignee: Package Machinery Company, East Longmeadow, Mass.

[22] Filed: June 4, 1976

[21] Appl. No.: 693,266

[52] U.S. Cl. .................................. 53/51; 53/73; 53/180 M

[51] Int. Cl.² .................... B65B 57/12; B65B 9/08

[58] Field of Search ............... 53/51, 73, 74, 180 M

[56] References Cited

UNITED STATES PATENTS

| 3,546,835 | 12/1970 | Mobley | 53/51 X |
| 3,589,095 | 6/1971 | James et al. | 53/51 |

*Primary Examiner*—Travis S. McGehee
*Attorney, Agent, or Firm*—McCormick, Paulding & Huber

[57] ABSTRACT

A package making machine of the vertical form, fill and seal variety has an electrical control system allowing the length of the package or bag made during each machine cycle to be controlled easily by manual adjustment of a control knob. In particular, the folded web tube from which packages are made is moved through the machine by a tube feeder driven during only a portion of each bag making cycle, the length of time during which the tube feeder is operated during each such cycle being varied to vary the package length. In addition to this control of package length via control of the tube feed time per bag making cycle, the electrical control circuitry may also include circuitry for controlling the package length in response to photoelectric detection of registration marks printed at regularly spaced points along the length of the web from which the tube is made. When the photoelectric package length control is used, the circuitry for controlling package length via control of tube feed time per bag making cycle may be used as a redundant or backup means for limiting the package length. That is, the latter circuitry may be set to produce a package only slightly longer than that produced by the photoelectric bag length control, with the result that if a given bag is not terminated by detection of a registration mark by the photoelectric circuit, it will subsequently be terminated, without the resulting package having excessive overlength, by the tube feed time per bag making cycle control circuit. The control system also includes a means for introducing, if desired, in each machine cycle a delay of readily adjustable duration between the deenergization of the sealers and the start of tube feed to assure the sealers are released from the tube when tube feed is initiated. In any event, the sealing function is initiated immediately upon the completion of the tube feeding function so that the remaining portion of the bag making cycle is devoted to the sealing function, and the tube feeding and sealing functions are so interlocked that changes may be made in machine speed and length of tube feed per bag making cycle without disturbing the proper sequencing of the tube feeding and sealing functions.

20 Claims, 3 Drawing Figures

CONTROL SYSTEM FOR PACKAGE MAKING MACHINE

BACKGROUND OF THE INVENTION

This invention relates to machines for making filled packages, and deals more particularly with package making machines of the type wherein a tube of packaging material is sealed periodically along longitudinally spaced lines extending transversely of the tube and is supplied with charges of product introduced to the tube between successive transverse seal formations.

The control system of this invention is herein shown and described, by way of example, in association with a package making machine of the type commonly referred to as a vertical form, fill and seal machine wherein the tube is made in the machine by folding a web of packaging material and sealing its overlapped side edges. However, at least in its broader aspects, the invention is not necessarily limited to such application and may find utility in other types of packaging machines, such as those in which the tube of packaging material is preformed apart from the packaging machine or formed by the packaging machine in some other manner. Hereinafter in this description, and in the claims which follow, the term "bag" is usually used to refer to the container produced by the machine in question and as so used it is intended to be generally synonymous with other terms such as "package", "pouch" or "envelope" which might have been equally as well chosen for the purpose.

In packaging machines of the transversely sealed tube kind, it is often desirable to have the capability of varying the length of the bags produced to suit the weight or volume of product to be contained in each bag, or to correspond to the length of each repeat of matter printed on the tube. Accordingly, it has been common to provide for some bag length adjustment, but usually the adjustment has been difficult to make and often requires shifting or replacement of timing cams or other mechanical parts which is time consuming; and, often the adjustment can be performed only while the machine is stopped. Further, the bag length determining mechanism is often interrelated with the sealing mechanism in such a way that adjustment of bag length disturbs the timing of the sealing function and thereby makes necessary some adjustment of the sealing mechanism to bring the machine back to a condition of proper operation at the new bag length.

Also, in packaging machines of the type with which this invention is concerned, it has been common in the past to feed the tube of packaging material through the machine by a reciprocating end sealer, the jaws of the sealer serving not only to form transverse end seals in the tube but also serving to grip and pull the tube through the machine as the end sealer moves in one direction of its reciprocating motion. Thus, in these machines the tube feeding function and the end sealing function are performed during the same portion of each bag making cycle, and the amount of time devoted to tube feeding during each cycle cannot be shortened beyond the minimum amount of time required to produce satisfactory end seals. If, in such machines, the tube is made by folding a web of sheet material into a tube with overlapped longitudinally extending side edges, and sealing the overlapped side edges to one another by a longitudinal seam sealer, the longitudinal seal forming operation is commonly performed during the return stroke of the end sealer when the tube is stationary relative to the remainder of the machine. Thus, the end seal operation and the longitudinal seal operation occur in different portions of the bag making cycle and each requires an associated minimum amount of time to effect acceptable seals. That is, each bag making cycle must include a first minimum amount of time for making satisfactory end seals and a second minimum amount of time for making a satisfactory longitudinal seal, and each cycle cannot be shortened in time beyond the sum of such two minimum time periods.

The general object of this invention, therefore, is to provide a control system for a vertical form, fill and seal packaging machine, or other packaging machine of the transverse tube sealing kind, having the capability of bag length adjustment by means of nothing more than a manually rotatable knob or similar easily manipulatable control element.

A further object of the invention is to provide a bag length adjusting means such as aforesaid whereby the bag length may be adjusted while the machine is running so as to allow the effect of a given change in the adjustment to be immediately observed.

Another object of the invention is to provide a bag length control means for a packaging machine such as aforesaid whereby changes in the bag length and machine speed (bags per minute) may be varied, without tools, while the machine is running and without causing problems in the sequencing of the tube feeding and sealing functions. In keeping with this object of the invention, the tube feeding function and the sealing function (that is, the end sealing function and the longitudinal sealing function, if any) are separated from one another so as to occur during different portions of each bag making cycle, but the sealing function is timewise interlocked to the tube feeding function so that, in each bag making cycle, the sealing function is initiated immediately upon the ending of the tube feeding function regardless of the length of time devoted to the tube feeding function. Therefore, changes in the tube feed time per bag making cycle and changes in the speed of the machine may be made without resulting in timewise overlaps in or gaps between the tube feeding and sealing functions.

Another object of the invention is to provide a packaging machine control system of the foregoing character whereby the machine is or may be operated on a product demand basis — that is, on the basis of a bag being made only in response to operation of the product feeder to deliver a product charge to the tube, thereby effecting a "no product — no bag" result.

Other objects and advantages of the invention will be apparent from the drawings forming a part hereof and from the following detailed description and claims.

SUMMARY OF THE INVENTION

The invention resides in a machine for making filled packages from a tube of packaging material by periodically feeding charges of product to the tube and sealing the tube, between product charges, at spaced points along its length along transversely extending seal lines, the machine having an electrical control system whereby the length of tube fed past the transverse sealer during each bag making cycle corresponds to a tube feed signal the duration of which may be varied by adjustment of a manually manipulatable control knob. More particularly, the invention resides in the control system for the machine including a means for generating a bag making cycle initiate signal and a tube feed timer for generating a tube feed signal in consequence of the cycle initiate signal, the timer having an associated manually operable knob or other similar means for selectively varying the duration of its tube feed signal. Also included in the control system is an operation circuitry which controls the operation of the tube feeder and of the transverse sealer in response to the cycle initiate signal and the tube feed signal so that at the start of the cycle initiate signal the transverse sealer is shifted to its nonoperated condition, at the start of the tube feed signal operation of the tube feeder is begun, and at the end of the tube feed signal operation of the tube feeder is stopped and the transverse sealer shifted to its operated condition. Consequently, the start of the sealing function is locked to the end of the tube feed function regardless of the duration of the tube feed signal. As a more specific aspect of the invention, the control system may also include a feed delay timer for providing a delay of manually adjustable duration between the start of the cycle initiate signal and the start of the tube feed signal to assure that the end sealer, and longitudinal seam sealer, if any, is moved free of the tube before tube feed is initiated in each bag making cycle, such tube feed delay sometimes being desirable, especially at high machine speeds.

The invention still further resides in a photoregistration bag length determining circuit being included in the control circuitry for the machine. With the photoregistration circuit in operation, the control system operates in the same manner as previously described except that in each machine cycle stopping of the tube feed and initiation of the transverse sealer operation is normally controlled in response to the detection of a registration mark by an associated photodetector. In this case, the first bag length determining circuit is set to act as a backup to the photoregistration circuit and to stop tube feed in a given bag making cycle should the photoregistration circuit fail to do so.

DETAILED DESCRIPTION OF THE PREFERRED EMBODIMENT

Figure 1:
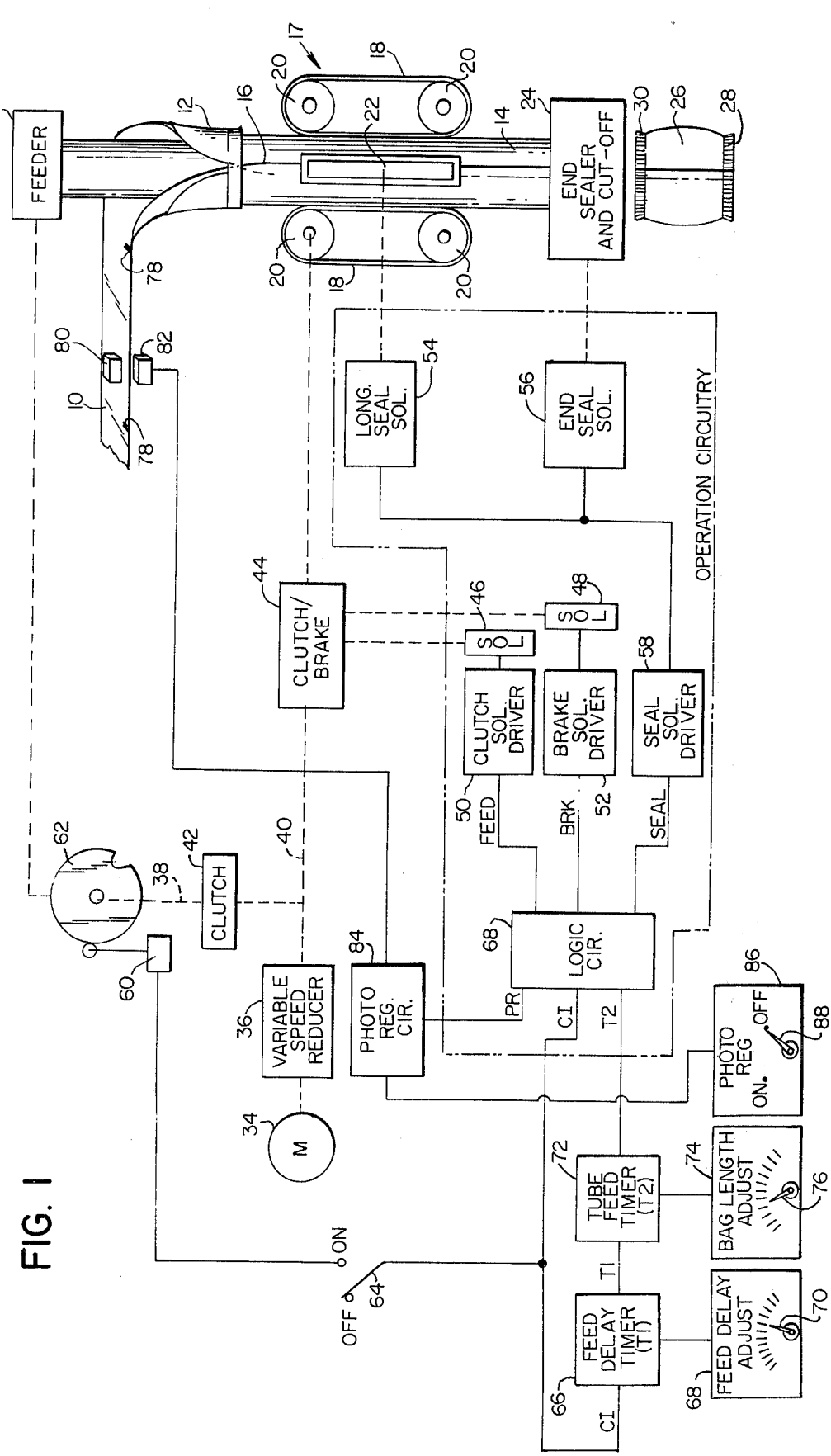
FIG. 1 is a schematic diagram illustrating a vertical form, fill and seal package making machine and an associated control system embodying the present invention.

Turning to FIG. 1, the invention is there shown in association with a packaging machine of the vertical form, fill and seal variety. In this machine, a web 10 of heat sealable packaging material is supplied from a roll or other source thereof (not shown) and is guided to a folder 12 which folds the web into a downwardly extending tube 14 having overlapped longitudinal side edges indicated at 16. The tube 14 is fed through the machine by a tube feeder 17 having a pair of intermittently operated feed belts 18, 18 located on opposite sides of the tube. Each belt 18 is trained over two rolls 20, 20 spaced from one another along the length of the tube and positioned so that one run of the belt is engageable with the outer surface of the tube. If desired, the tube engaging run of each belt may be porous and backed up by a vacuum chamber so as to attract the tube to the belt by the vacuum to increase the grip between the tube and belt. The construction of the tube feeder is not, however, essential to the invention and various types of tube feeders other than that illustrated may be employed without departing from the invention.

Below the folder 12 is a longitudinal seam sealer 22 for heat sealing to one another the overlapped side edges 16 of the tube. The longitudinal sealer 22 has operated (closed) and non-operated (open) conditions. In its operated condition, it is pressed against the overlapped side edges 16 of the tube, while the feed of the tube by the feeder is stopped, and against a backup bar or other stationary part inside of the tube to react the force of the sealer, and a shoe heated by an electrical resistance heater or other heat source applies heat to the overlapped edges 16 to weld them to one another. In its non-operated condition, the sealer 22 is released from the tube to allow the tube to be moved past it.

Below the tube feeder 17 and longitudinal seam sealer 22 is a transverse or end sealer 24 which operates to flatten the tube 14 along a zone extending transversely of the tube and to heat seal the two opposite flattened sides of the tube to one another along such zone to form the top and bottom end seals of packages. One such package is indicated at 26, its bottom end seal at 28 and its top end seal at 30.

The sealer 24 may take various different forms and in the present invention is taken to be one of a well known type which during each operating cycle forms the top end seal of one package and the bottom end seal of the next package and cuts the tube between such two seals to separate the terminal package from the remainder of the tube. For example, the end sealer 24 may consist of two jaws located on opposite sides of the tube 14 and movable between closed and opened positions relative to one another. Further, one of the jaws may carry three horizontal electrical impulse or ribbon heaters oriented parallel to one another and extending transversely of the tube. In the operating condition of the sealer the two jaws are first moved towards one another to flatten the tube and subsequently the three heaters and electrically impulsed, the heat generated by two of the heaters serving to form the two associated end seals and the heat from the third heater, positioned between the other two heaters, serving to sever the tube. In the non-operated condition of the sealer, the two jaws are moved from one another to release the tube and to thereby allow it to be moved by the tube feeder 17 relative to the sealer 24 to bring a new seal zone into alignment with it.

A cyclicly operable product feeder 32, feeds charges of product into the tube 14 through its open upper end. The charges of product are delivered between successive operations of the end sealer 24 so that the resultant packages produced by the machine are filled with the product.

Associated with the package making machine of FIG. 1 as so far described, is a control circuitry, constituting the essence of the present invention, which controls the operation and timing of the tube feeder 17, end sealer 24, longitudinal seam sealer 22 and feeder 32 in a novel and improved way and in particular in such a way as to allow easy adjustments in the relative timings of the components to effect controlled changes in the length of the bags 26 made by the machine.

Referring to FIG. 1, the control system there illustrated includes a drive motor 34 which drives the input member of a variable speed reducer 36, the reducer 36 being one which is manually or otherwise adjustable to vary the speed ratio between its input and output members. The output drive member of the reducer 36 is drivingly connected to the product feeder 32 by a first power transmitting train indicated by the broken line 38, and it is also connected to the tube feeder 17 by a second power transmitting train indicated by the broken line 40. In the first train 38 is a clutch 42 selectively engageable or disengageable to make or break the driving connection between the speed reducer and the product feeder. During normal operation of the machine, the clutch 42 is engaged with the result that the feeder 32 is continuously driven through repeated cycles of operation to cyclicly discharge charges of product into tube 14.

In the second power transmitting train 40 is a clutch/brake mechanism 44. This mechanism includes both a clutch for making and breaking the driving connecting between the speed reducer 36 and the tube feeder 17 and a brake for braking the motion of the tube feeder. The mechanism 44 has a drive mode and a brake mode. In the drive mode, the clutch portion of it is engaged to drivingly connect the tube feeder 17 to the speed reducer 36 and the brake portion of it is released. In the brake mode, the clutch portion is disengaged to break the driving connection between the speed reducer and the tube feeder and the brake is engaged to stop and hold the tube feeder against movement. The clutch portion of the mechanism 44 is operated by a clutch solenoid 46 and the brake portion is operated by a brake solenoid 48. Power for the solenoid 46 is supplied by a clutch solenoid driver 50 and likewise power for the solenoid 48 is supplied by a brake solenoid driver 52.

The longitudinal seam sealer 22 and the end sealer 24 are operated in unison. In the illustrated case, the operating means comprises a solenoid 54 for operating the longitudinal seam sealer 22 and a solenoid 56 for operating the end sealer 24, and a seal solenoid driver 58 having its output connected to both of the solenoids 54, 56. Although in FIG. 1, the solenoids 54 and 56 are shown directly connected to sealers 22 and 24, such direct connection is not essential and instead one or both of the solenoids may operate hydraulic valves for controlling hydraulic cylinders which in turn shift the sealers 22 and 24 between their operated and non-operated conditions.

The timing of the operating of the tube feeder 17 and of the sealers 22 and 24 is controlled by timing and logic circuits responsive to "cycle initiate" signals each signalling the start of a new bag making cycle. In the illustrated case, the source of such cycle initiate (CI) signals is a switch 60 operated by a cam 62 in the power transmitting train 38 driving the feeder 32, the cam 62 being driven through one revolution per cycle of the feeder 32, a CI signal, therefore, being produced at a given point in each cycle of the feeder. Further, as the feeder is continuously driven through repeated cycles of its operation, the switch is repeatedly operated to produce a time-spaced train of CI signals. An on/off switch 64 controls transmission of the CI signals to the remaining control circuitry. When the switch 64 is closed, the CI signals are fed to both a feed delay timer 66 and a logic circuit 68.

Figure 2:
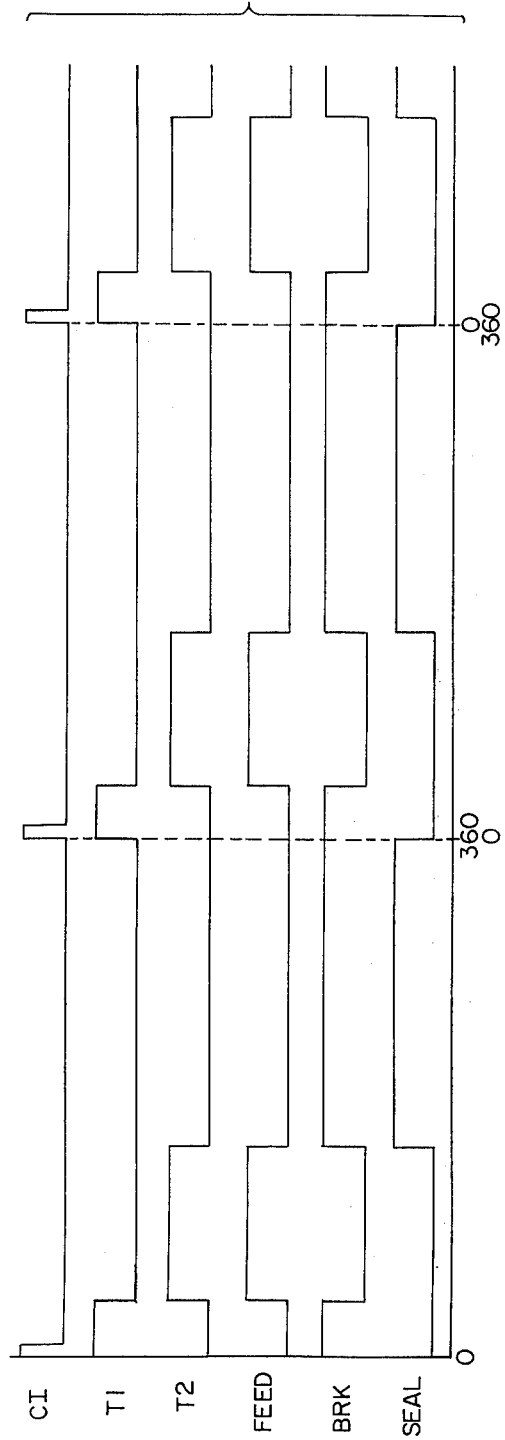
FIG. 2 is a diagram illustrating the nature of various signals appearing in various places in the control system during each bag making cycle of the apparatus of FIG. 1 when the photoregistration bag length determining circuit is inoperative.

As shown in FIG. 2, the appearance of each CI signal triggers the timer 66 to produce a feed delay signal T1. The duration of the T1 signal is in turn variable, preferably from a zero amount of time to some selected maximum amount of time, by an associated means 68, for example a potentiometer, having a manually operable control knob 70.

The feed delay signal T1 from the feed delay timer 66 is fed to a second similar timer 72, a tube feed timer, which in response to the end of the signal T1 is triggered to produce a tube feed signal T2 the interval of which is adjustable by an associated means 74 having a manually operable control knob 76.

The tube feed signal T2 from the timer 72 is supplied to the logic circuit 68. In response to the CI signal the the T2 signal appearing during each bag making cycle, the logic circuit 68 operates to produce FEED, BRK and SEAL signals supplied respectively to the clutch solenoid driver 50, the brake solenoid driver 52 and the seal solenoid driver 58 in the manner shown in FIG. 2. The BRK signal is the inverse of the FEED signal. At the start of each cycle, the FEED signal is off and the BRK signal on to hold the tube feeder 17 stationary, and the SEAL signal is off to hold the sealers 22 and 24 in their open or non-operated conditions. At the end of T1 (or the equivalent beginning of T2) the FEED signal goes on and the BRK signal off to start the tube feeder in motion. The FEED and BRK signals thereafter remain unchanged, and the tube feeder remains in motion, until the end of T2 at which time the FEED signal is again turned off and the BRK signal on to stop the tube feeder. At the same time, the SEAL signal is turned on to shift the sealers 22 and 24 to their operated or closed conditions. The sealers thereafter remain closed until the end of the cycle, signalled by the appearance of a new CI signal, at which time the SEAL signal is turned off to cause the sealers 22 and 24 to be shifted from their operated to their non-operated or open conditions, and thereafter a similar new bag making cycle is executed.

The purpose of the feed delay timer 66 and its associated feed delay signal T1 is to provide a time delay at the beginning of each new bag making cycle assuring time for the sealers to move away from and release the tube before the tube is moved by the tube feeder. At low machine speeds (low rates of bags per minute) such initial time delay may not be required and, in this event, the associated adjustment knob 70 may be set to provide a zero time delay T1. Furthermore, in some applications no feed delay may be required under any circumstances, and in such case, the feed delay timer 66 may be omitted from the control system and the tube feed timer 72 made directly responsive to the CI signals.

The purpose of the tube feed timer 72 and its associated tube feed signal T2 is to control the length of time the tube feeder 17 is driven during each bag making cycle. This in turn controls the length of tube fed by the tube feeder during each cycle and accordingly determines the length of bag made in that cycle. Therefore, by varying the duration of the signal T2, by simple setting of the manual knob 76, the length of the bags produced by the machine may be readily varied.

The circuitry which responds to the cycle initiate (CI) and to the tube feed (T2) signals to operate the tube feeder and the sealers in the manner discussed above is referred to in FIG. 1 as the operation circuitry, and various different forms of such circuitry may be used without departing from the scope of this invention. Also, much of such circuitry, such as the logic circuit 68 and the drivers 50, 52 and 58, as well as the associated timers 66 and 72, may if desired, be implemented as solid state devices of relatively low cost and small size.

The system of FIG. 1 also includes an optionally usable photoregistration means for enabling the length of bags produced to be determined by registration marks 78, 78 printed at regularly spaced intervals along the length of the web 10 from which the packages are made. This photoregistration means includes a light source 80, associated photodetector 82 and a related photoregistration circuitry 84. Part of the circuit 84 is a switch 86 having a manually operable knob 88 through which the remainder of the circuit 84 may be enabled or disabled with regard to the sending of signals to the logic circuit 68. When the switch 86 is turned on, the circuit 84 operates to supply a mark detect or PR signal to the logic circuit 68 each time a new registration mark 78 is moved into registry with the photodetector 82.

Figure 3:
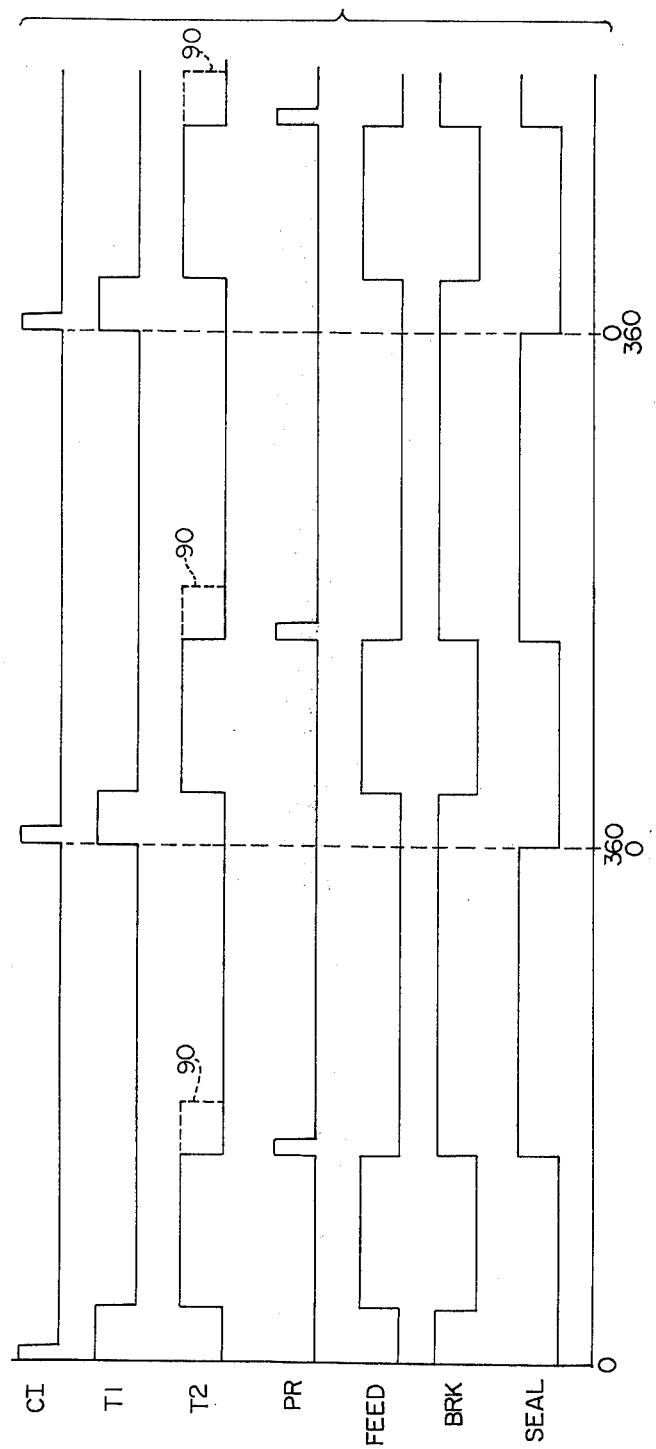
FIG. 3 is a diagram similar to FIG. 2 but showing the nature of signals appearing at various places in the control system of the machine of FIG. 1 during each bag making cycle when the photoregistration bag length determining circuit is in operation.

The operation of the system of FIG. 1 with the photoregistration circuit enabled is shown in FIG. 3. The operation is smaller to that with the photoregistration circuit disabled, as shown by FIG. 2, except that in each cycle the turning off of the tube feeder 17 and the turning on (that is, the shifting to their operated states) of the sealers is signalled by the first to occur of either the normal ending of the tube feed signal T2 or the appearance of the PR signal. When the photoregistration circuitry is used, the tube feed timer 72 is set, by the knob 76, to produce a tube feed signal T2 having such duration as to normally end, as indicated by the broken line 90 in FIG. 3, a short time after the appearance of a PR signal. However, the logic circuit 68 operates to terminate the then running tube feed signal T2 in response to the leading edge of a PR signal. Therefore, in each bag making cycle, the PR signal appears first and turns off the tube feed signal T2, which in turn turns off the tube feeder to determine the length of the bag made during that cycle. If during a given cycle, a PR signal does not appear, as for example because of a missing registration mark 78 on the web, the bag under production will nevertheless be terminated shortly after the expected appearance of the missing PR signal by the normal ending to the associated T2 signal, thereby producing a generally acceptable bag having only a slightly longer length than desired.

From the foregoing description, it should also be noted that the cycle initiate signals, each of which initiates a new bag producing cycle, since they are derived from the feeder 32, cause the bag producing system to have an "on demand" character whereby bags are produced only when needed to package products supplied by the feeder 32. If the feeder does not supply product charges to the tube 14, as for example, because of the clutch 42 being disengaged, no CI signals are produced and consequently no bags are made. The cycle initiate signals do not, in keeping with the broader aspects of the invention, have to be related to the operation of a feeder such as the feeder 32 and may in some other way be generated in response to the need or demand for a bag. For example, instead of a mechanical feeder such as the feeder 32, product charges might be introduced to the tube of packaging material by an operator manually repeated y dumping a charge into the upper end of the tube, and each time such a charge is dumped into the tube, the operator might thereafter produce a cycle initiate signal by manually operating a switch provided to produce such signal. Other ways of producing cycle initiate signals may readily be envisioned. Also, the speed of the machine in bags produced per minute is readily varied by adjusting the variable speed reducer 36, and as such speed adjustments are made the time delays T1 and T2 are likewise readily adjustable by the knobs 70 and 76 to provide them with such durations as required at the different machine speeds to produce bags of desired length.

I claim:

1. The combination in a machine for making packages by transversely sealing a tube of packaging material at spaced points along its length of: a means providing a tube of packaging material, an end sealer with operated and non-operated conditions for flattening said tube along a zone extending transversely of said tube and for sealing the opposite flattened sides of said tube to one another along said transversely extending zone, relative motion drive means having powered and non-powered modes for feeding, during its powered mode, said tube and said end sealer relative to one another from alignment of said end sealer with one transverse seal zone of said tube to alignment of said end sealer with the next such transverse seal zone, means for producing bag making cycle initiate signals, a feed timer for generating a feed signal in consequence of each appearance of a cycle initiate signal, said feed timer having an associated manually operable means for selectively varying the duration of said feed signal, and operation circuitry responsive to at least said feed signal for controlling the operation of said relative motion drive means and said end sealer so that at the start of said feed signal said relative motion drive means is shifted from its non-powered to its powered mode and at the end of said feed signal said relative motion drive means is shifted from its powered to its non-powered mode, and so that said end sealer is shifted from its non-operated to its operated condition and subsequently back to its non-operated condition during the interval between the end of said feed signal and the start of the next such feed signal.

2. The combination defined in claim 1 further characterized by said end sealer being stationary relative to the path of said tube of packaging material through said machine.

3. The combination defined in claim 2 further characterized by said relative motion drive means comprising at least one tube driving element drivingly engageable with the outside surface of said tube.

4. The combination defined in claim 3 further characterized by said tube driving element being a drive belt trained over two rollers spaced from one another along the length of said path of tube movement to define one run of said belt extending parallel to said path and along which run said belt is drivingly engageable with said tube.

5. The combination defined in claim 1 further characterized by a photoregistration circuit including a photodetector for detecting registration marks occurring on the packaging material of which said tube is made, said photoregistration circuit being operable to generate a mark detect signal each time one of said registration marks is moved into registry with said photodetector, and said operation circuitry being additionally responsive to said mark detect signals so that subsequent to said relative motion drive means being shifted to its powered mode at the start of a given feed signal said relative motion drive means is shifted back to its non-powered mode upon the appearance of a mark detect signal if not already shifted back to its non-powered mode by the normal termination of said given feed signal.

6. The combination defined in claim 1 further characterized by said means for providing a tube of packaging material comprising means providing a web of such packaging material, a folder for folding said web of material into a tube with overlapped side edges, and a longitudinal seam sealer for sealing said overlapped side edges of said tube to one another.

7. The combination defined in claim 6 further characterized by said web of packaging material having registration marks thereon occurring at regularly spaced intervals along its length, and a photoregistration circuit including a photodetector arranged to sense said registration marks for producing a mark detect signal each time one of said registration marks is moved into registry with said photodetector, said operation circuitry being also responsive to said mark detect signals so as to shift said relative motion drive means from its powered to its non-powered mode during each bag making cycle in the event such mark detect signal occurs after the initiation but before the normal end of the associated feed signal.

8. The combination defined in claim 7 further characterized by said longitudinal sealer being one having operated and non-operated conditions, and said operation circuitry being operable to shift said longitudinal sealer between its operated and non-operated conditions in unison with the corresponding shifts of said end sealer between its operated and non-operated conditions.

9. The combination defined in claim 1 further characterized by a product feeder continuously driven through repeated cycles of operation for cyclicly feeding charges of product into said tube, and said means for producing a bag making cycle initiate signal comprising means producing one such signal during each cycle of operation of said product feeder.

10. The combination defined in claim 9 further characterized by a drive motor, a variable speed reducer having an input member connected to and driven by said drive motor and also having an output member, said speed reducer being adjustable to vary the speed ratio between said output member and said input member, a first power transmitting train between said output member and said feeder, and a second power transmitting train between said output member and relative motion drive means.

11. The combination defined in claim 10 further characterized by a clutch in said second mechanical power transmitting train which clutch is selectively operable in either an engaged mode in which it drivingly connects said output member to said relative motion drive means or in a disengaged mode in which it drivingly disconnects said output member from said relative motion drive means, said engaged mode of said clutch corresponding to said powered mode of said relative motion drive means and said disengaged mode of said clutch corresponding to said non-powered mode of said relative motion drive means, said operation circuitry being coupled with said clutch and operable to shift said clutch between said engaged and disengaged modes to effect said powered and non-powered modes of said relative motion drive means.

12. The combination defined in claim 11 further characterized by said clutch having a brake associated therewith, said brake being operable when said clutch is disengaged to brake said relative motion drive means and being operable when said clutch is engaged to release said relative motion drive means.

13. The combination defined in claim 1 further characterized by another timer for generating a feed delay signal is consequence of each appearance of a bag making cycle initiate signal, said another timer having an associated manually operable means for selectively varying the duration of said feed delay signal, said feed timer being operable to initiate its feed signal at the end of said feed delay signal.

14. The combination in a machine for making packages by transversely sealing a tube of packaging material at spaced points along its length of: a means providing a tube of packaging material, an end sealer with operated and non-operated conditions for flattening said tube along a zone extending transversely of said tube and for sealing the opposite flattened sides of said tube to one another along said transversely extending zone, said end sealer being stationary with respect to the path of movement of said tube through said machine, a tube feeder having powered and non-powered modes for moving, during its powered mode, said tube along its path of movement through said machine relative to said end sealer, means for producing time-spaced bag making cycle initiate signals, a timer for generating a tube feed signal of manually variable duration in consequence of each appearance of a bag making cycle initiate signal, and circuitry responsive to the start of each such tube feed signal for shifting said tube feeder from its non-powered to its powered mode and responsive to the end of each such tube feed signal for shifting said tube feeder from its powered to its non-powered mode and for shifting said end sealer from its non-operated to its operated condition and subsequently back to its non-operated condition during the interval between the end of such tube feed signal and the start of the next such tube feed signal.

15. The combination in a machine for making packages by transversely sealing a tube of packaging material at spaced points along its length of: a means providing a tube of packaging material, an end sealer with operated and non-operated conditions for flattening said tube along a zone extending transversely of said tube and for sealing the opposite flattened sides of said tube to one another along said transversely extending zone, said end sealer being stationary with respect to the path of movement of said tube through said machine, a tube feeder having powered and non-powered modes for moving, during its powered mode, said tube in one direction past said end sealer, means for producing time-spaced bag making cycle initiate signals, a timer for generating a tube feed signal in consequence of each appearance of a cycle initiate signal, said timer having an associated manually operable means for selectively varying the duration of said tube feed signal, and operation circuitry for controlling the operation of said tube feeder and of said end sealer in response to said cycle initiate signals and said tube feed signals, said operation circuitry being so constructed and arranged that: (1) at the start of each cycle initiate signal said end sealer is shifted from its operated to its non-operated operated condition, (2) at the start of each tube feed signal said tube feeder is shifted from its non-powered to its powered mode, and (3) at the end of each tube feed signal said tube feeder is shifted from its powered to its non-powered mode and said end sealer is shifted from its non-operated to its operated condition.

16. The combination in a machine for making packages by transversely sealing a tube of packaging material at spaced points along its length of: a means providing a tube of packaging material, an end sealer with operated and non-operated conditions for flattening said tube along a zone extending transversely of said tube and for sealing the opposite flattened sides of said tube to one another along said transversely extending zone, a cyclicly operable product feeder for cyclicly feeding charges of product to be packaged into said tube, a tube feeder for moving said tube longitudinally of itself past said end sealer, a mechanical power source having an output drive member, a first mechanical power transmitting train between said drive member and said product feeder, a second mechanical power transmitting train between said drive member and said tube feeder, a clutch in said second power train selectively operable in either an engaged mode in which it drivingly connects said drive member to said tube feeder or in a disengaged mode in which it drivingly disconnects said drive member from said tube feeder, means associated with said product feeder for producing a bag making cycle initiate signal during each cycle of said product feeder, a timer for generating a tube feed signal in consequence of each appearance of a cycle initiate signal, said timer having an associated manually operable means for selectively varying the duration of said tube feed signal, and operation circuitry for controlling the operation of said clutch and said end sealer in response to said cycle initiate signals and said tube feed signals, said operation circuitry being so constructed and arranged that (1) at the start of each cycle initiate signal and end sealer is shifted from its operated to its non-operated condition, (2) at the start of each tube feed signal said clutch is shifted from its disengaged to its engaged mode, and (3) at the end of each tube feed signal said clutch is shifted from its engaged to its disengaged mode and said end sealer is shifted from its non-operated to its operated condition.

17. The combination in a machine for making packages of: a folder for folding a web of sheet material into a tube with overlapped longitudinal edge portions, a longitudinal seam sealer with operated and non-operated conditions for sealing said overlapped longitudinal edge portions of said tube to one another, an end sealer with operated and non-operated conditions for flattening, during said operated condition, said tube along a zone extending transversely of said tube and for sealing the opposite flattened sides of said tube to one another along said transversely extending zone, a cyclicly operable product feeder for cyclicly feeding charges of product to be packaged into said tube, a tube feeder for moving said tube longitudinally of itself past said longitudinal seam sealer and said end sealer, a mechanical power source having a common output drive member, a first mechanical power transmitting train between said product feeder and said common drive member, a second mechanical power transmitting train between said common drive member and said tube feeder, a clutch/brake mechanism in said second power train selectively operable in either a drive mode in which it drivingly connects said common drive member to said tube feeder or in a brake mode in which it drivingly disconnects said common drive member from said tube feeder and brakes said tube feeder, means associated with said product feeder for producing a bag making cycle initiate signal during each cycle of said product feeder, a first timer responsive to said cycle initiate signals for generating a feed delay signal starting at the start of each seal cycle initiate signal, said first timer having an associated manually operable means for selectively varying the duration of said feed delay signal, a second timer responsive to said feed delay signal for generating a tube feed signal starting at the end of said feed delay signal, said second timer having an associated manually operable means for selectively varying the duration of said tube feed signal, and operation circuitry for controlling the operation of said clutch/brake, said longitudinal seam sealer and said end sealer in response to said cycle initiate signals and said tube feed signals, said operation circuitry being so constructed and arranged that (1) at the start of each cycle initiate signal said longitudinal seam sealer and said end sealer are both shifted from their operated to their non-operated conditions, (2) at the start of each tube feed signal said clutch/brake mechanism is shifted from its brake mode to its drive mode, and (3) at the end of each tube feed signal said brake/clutch mechanism is shifted from its drive mode to its brake mode and said longitudinal seam sealer and said end sealer are both shifted from their non-operated to their operated condition.

18. The combination in a machine for making packages by transversely sealing a tube of packaging material at spaced points along its length of: a means providing a tube of packaging material, an end sealer with operated and non-operated conditions for flattening said tube along a zone extending transversely of said tube and for sealing the opposite flattened sides of said tube to one another along said transversely extending zone, said end sealer being stationary with respect to the path of movement of said tube through said machine, a tube feeder having powered and non-powered modes for driving, during its powered mode, said tube along its path of movement through said machine relative to said end sealer, means for producing time-spaced bag making cycle initiate signals, a first timer responsive to said cycle initiate signals for generating a feed delay signal starting at the start of each cycle initiate signal, said first timer having an associated manually operable means for selectively varying the duration of said feed delay signal, a second timer responsive to said feed delay signal for generating a tube feed signal starting at the end of each feed delay signal, said second timer having an associated manually operable means for selectively varying the duration of said tube feed signal, and operation circuitry for controlling the opertion of said tube feeder and of said end sealer in response to said cycle initiate signals and said tube feed signals, said operation circuitry being so constructed and arranged that (1) at the start of each cycle initiate signal said end sealer is shifted from its operated to its non-operated conditions, (2) at the start of each tube feed signal said tube feeder is shifted from its non-powered to its powered mode, and (3) at the end of each tube feed signal said tube feeder is shifted from its powered to its non-powered mode and said end sealer is shifted from its non-operated to its operated condition.

19. The combination defined in claim 18 further characterized by a photoregistration circuit including a photodetector for detecting registration marks occurring on the packaging material from which said tube is made, said photoregistration circuit being operable to generate a mark detect signal each time one of said registration marks is moved into registry with said photodetector, and said operation circuitry being additionally responsive to said mark detect signal so that subsequent to said tube feeder being shifted to its powered mode at the start of a given tube feed signal said tube feeder is shifted back to its non-powered mode upon the appearance of mark detect signal if not already shifted back to its non-powered mode by the normal termination of said given tube feed signal.

20. The combination defined in claim 18 further characterized by a cyclicly operable product feeder for cyclicly feeding charges of product into said tube, and said means for producing bag making cycle initiate signals consisting of means associated with said feeder for producing one such cycle initiate signal during each cycle of said product feeder.

* * * * *